(12) United States Patent
Cornils

(10) Patent No.: US 6,711,407 B1
(45) Date of Patent: Mar. 23, 2004

(54) ARRAY OF PROCESSORS ARCHITECTURE FOR A SPACE-BASED NETWORK ROUTER

(75) Inventor: Curtis Lee Cornils, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 386 days.

(21) Appl. No.: 09/615,307

(22) Filed: Jul. 13, 2000

(51) Int. Cl.[7] ............................................... H04Q 7/20
(52) U.S. Cl. .................. 455/428; 455/427; 455/112; 370/315; 370/316; 370/325; 370/323; 370/319; 370/401; 370/285; 370/258
(58) Field of Search ................................ 370/315, 316, 370/325, 323, 319, 401, 285, 258; 455/427, 112.1; 700/4; 710/56

(56) References Cited

U.S. PATENT DOCUMENTS

| | | | | |
|---|---|---|---|---|
| 4,858,225 A | | 8/1989 | deSantis ........................ 370/50 |
| 5,117,430 A | * | 5/1992 | Berglund ..................... 340/635 |
| 5,796,744 A | | 8/1998 | Krawczak et al. ............. 370/50 |
| 5,799,015 A | * | 8/1998 | Bennett et al. ............... 370/388 |
| 5,802,578 A | | 9/1998 | Lovett ........................ 711/147 |
| 6,085,263 A | * | 7/2000 | Sharma et al. ............... 710/119 |
| 6,160,994 A | * | 12/2000 | Wiedeman ............... 244/158 R |
| 6,205,119 B1 | * | 3/2001 | Kaczynski ................... 370/231 |
| 6,366,776 B1 | * | 4/2002 | Wright et al. ................ 370/347 |
| 6,381,223 B1 | * | 4/2002 | Olpe ........................... 370/285 |
| 6,424,870 B1 | * | 7/2002 | Maeda et al. ................ 370/400 |

* cited by examiner

*Primary Examiner*—Sinh Tran
*Assistant Examiner*—David Q Nguyen
(74) *Attorney, Agent, or Firm*—Frank J. Bogacz

(57) ABSTRACT

A space-based network router architecture (20) is disclosed. The router includes an array-of-processors architecture (20) for routing uplink and downlink traffic of a communications system (10). The architecture comprises multiple node interface chips (26) linked to one another via horizontal and vertical rings (22, 24), thus forming a mesh (21). Associated with each node interface chip (26) is a processor (28) and either a demodulator (30) or modulator (32). Each node interface chip (26) selectively transfers a signal depending upon the particular signal's destination and processing requirements. The router architecture (20) provides scalabitly, fault-tolerance and flexibility, as well as structural advantages over present router systems.

18 Claims, 2 Drawing Sheets

ARRAY OF PROCESSORS ARCHITECTURE FOR A SPACE-BASED NETWORK ROUTER

BACKGROUND OF THE INVENTION

1. Field of the Invention

The present invention relates generally to satellite communications, and more particularly to satellite-based network routers.

2. Background of the Invention

For several decades, satellites have been an integral part of communication systems. Inherent to such communication systems is the need for routing signals and/or messages to their appropriate destinations. Until recently, routing functions have always been accomplished using ground-based routers, with a satellite acting only as a "mirror", reflecting uplink traffic back to a ground-based central station. It is this central station which performs the routing of messages to their appropriate destinations. Using ground-based routing, however, requires traffic to go through land lines, such as fiber-optic cables. As a result, the rate of transfer of information is significantly decreased.

Recently, a new generation of satellites have been introduced which act not only as uplink traffic "mirrors" but perform the routing functions themselves, thus becoming space based routers. Space-based routers must support a large number of ports. Ports are analogous to doorways into and out of a router system. Port types comprise input, output and bi-directional ports. The communications system interacts via radio waves, which fall within an allocated spectrum of frequencies. It is the nature of these systems to reuse an allocated spectrum as many times as possible. Multi-beam, phased array antennas are implemented to reuse an allocated spectrum many times over. Spectral reuse is achieved by forming as many uplink and downlink beams as size, weight and power, of a particular satellite, permit. As such, beams themselves become ports to and from the router. There can be hundreds and even thousands of ports resulting from the spectral reuse design. Additional ports for the router are formed from crosslinks between satellites within a constellation of satellites.

Earlier generations of these satellite based routers implemented hardware switches to perform the routing function. Hardware switches, however, are limited in bandwidth and centralize the routing process. This makes the routing process more susceptible to failures. Also, in order for such a system to grow or change its routing scheme, the hardware switches require redesign. This would require the satellite to be brought back to earth for modification or replacement by a completely new satellite.

It is therefore desirable to provide a routing architecture, for space-based routers, which overcomes the limitations of reduced bandwidth and decentralizes the routing process. It is also desirable to implement a routing architecture whose components do not require redesign to allow for scaleable growth or routing scheme changes.

BRIEF DESCRIPTION OF THE DRAWINGS

The present invention will become fully understood from the detailed description and the accompanying drawings, wherein.

DETAILED DESCRIPTION OF THE PREFERRED EMBODIMENTS

The present invention provides a matrix of processors architecture for use in space-based routers, which overcomes the deficiencies inherent when using hardware switches to perform the routing functions. The hardware necessary to accomplish a matrix of processors architecture comprises a processor at each of a plurality of nodes and a corresponding bus interface chip, which connects each processor into the bus system. If the system grows, more of these "basic building blocks" are required. However, redesigning of the devices themselves (processor and bus interface chip) is not required. Earlier generations, using hardware switch schemes, require redesign of the hardware as systems grow or routing schemes change. Another advantage of having these "basic building blocks", is that the processor, memory and bus interface chip become a module that can be located wherever it is mechanically advantageous rather than having the bus structure define the mechanical layout.

In this manner, the present invention provides a distributed routing architecture for space-based routers that is scalable to meet a routing need. As the size of the router increases, the bandwidth increases correspondingly to meet the growing data transport needs. The distributed processing nature of the present invention yields significantly increased processing power to handle link layer processing right at the link termination. Increased satellite lifetime and reduced system costs are achieved through a reduced number of part types and a reduced number of interconnects between nodes. Additionally, an array of processors architecture results in a distributed, parallel processing/multiprocessing router, which is scalable, highly fault tolerant, flexible and requires fewer chip types than the centralized switch router approach. While the below described embodiment is a preferred embodiment, it will be appreciated that this embodiment is merely exemplary and does not limit the applicability of the invention.

Figure 1:
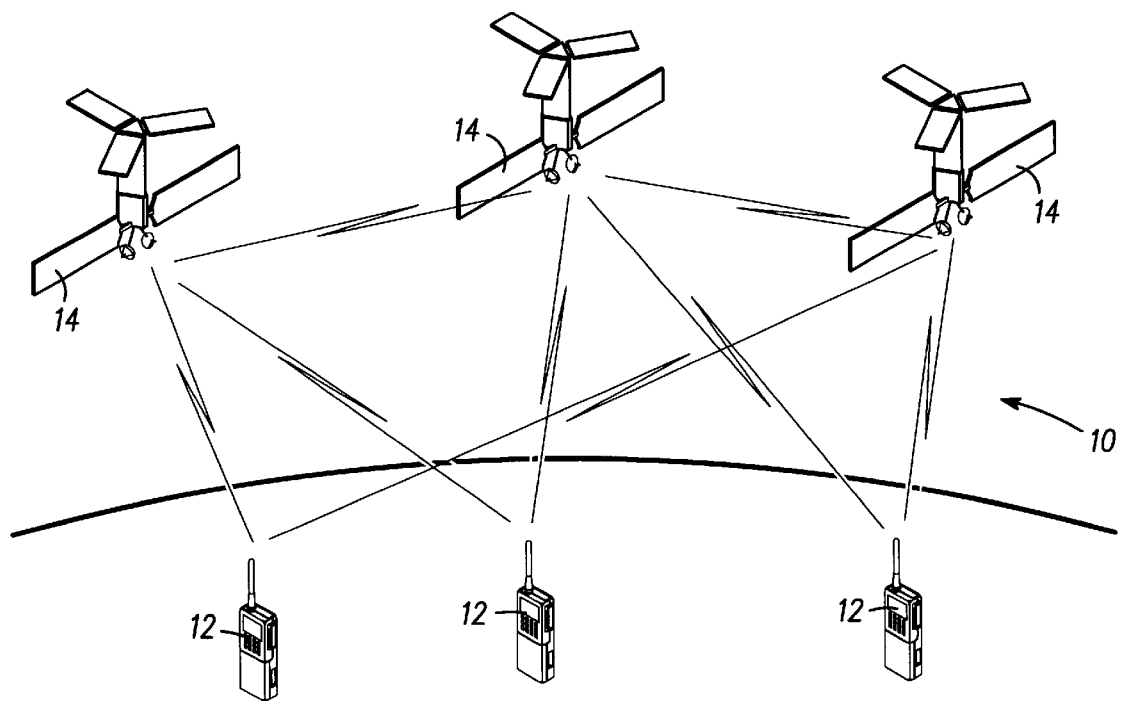
FIG. 1 is a schematic view of a satellite communications system according to the principles of the present invention.

Referencing FIG. 1, an exemplary satellite communications system 10 is shown, comprising individual subscriber units 12 and a constellation of satellites 14. The satellites 14 receive uplink and downlink information from the individual subscriber units 12 which may include wireless telephones and wireless data terminals. Additionally, the satellites 14 can be in cross-communication with one another.

Figure 2:
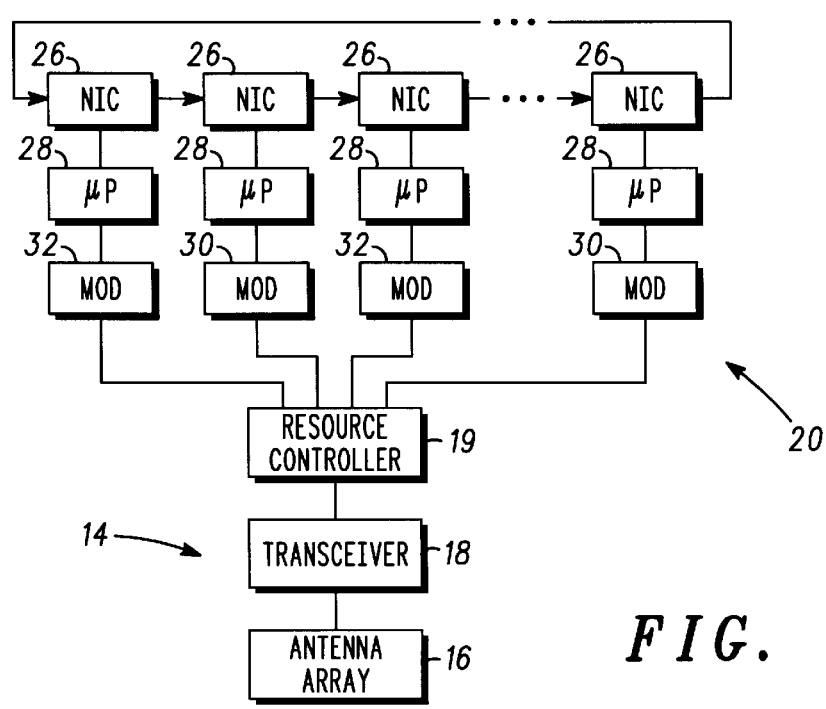
FIG. 2 is a block diagram of an internal satellite structure according to the principles of the present invention.

FIG. 2 is a block diagram of various components associated with satellite 14, including an antenna array 16, a link signal detection component or transceiver 18, a resource controller 19 and an array of processors 20. The transceiver 18 sends and receives signals between the satellite 14 and the individual subscriber units 12, as well as between other satellites 14 in the constellation. The resource controller 19 functions to manage bidirectional communications between the transceiver 18 and the array of processors 20.

Figure 3:
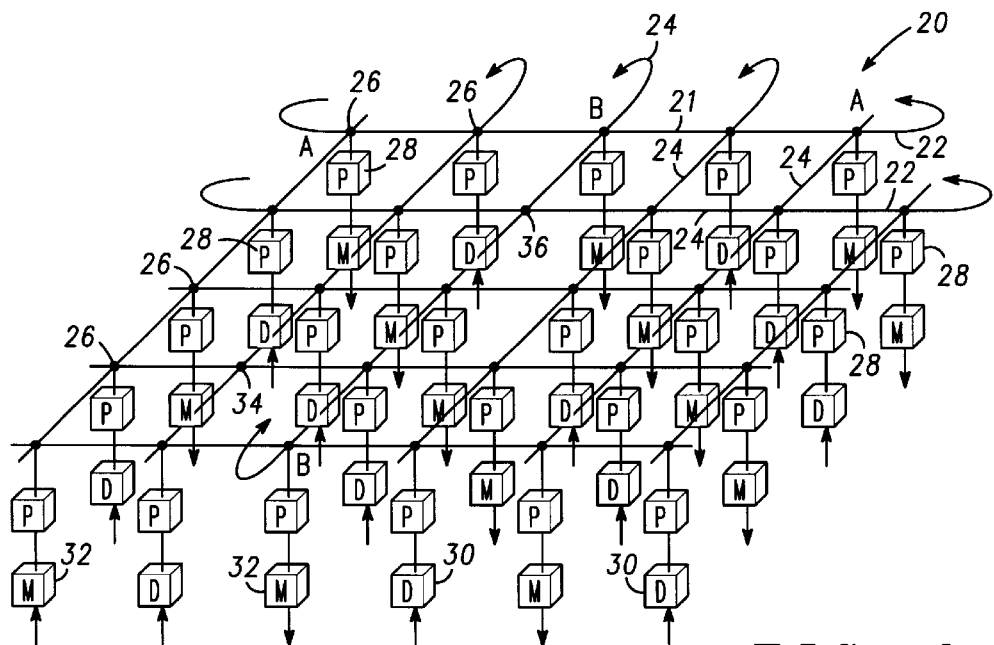
FIG. 3 is a schematic view of an array of processors architecture according to the principles of the present invention.

Referencing FIG. 3, an array-of-processors architecture for a space-based network router, will now be described in detail. The two-dimensional array 20, employs horizontal communication components or horizontally oriented rings 22 that alternately run left and right. Similarly, vertical communication components or vertically oriented rings 24 run alternately up and down. The communication rings 22, 24 are interconnected by at least one node interface chip 26 for forming the two-dimensional array. As shown, the architecture formed by the communication rings 22, 24 create a communication bus between adjacent nodes 26. Preferably, the communication rings 22, 24 are scalable coherent interface (SCI) rings. However, one skilled in the art will appreciate that other suitable bus architectures can be used for interconnecting nodes 26. In the spirit of simplifying the figure, the completed rings are not shown for every ring 22, 24, although it should be understood that each ring 22 connects from A to A and each ring 24 connects from B to B. The advantage of a two dimensional array 20, is that it scales well and the routing decisions between communication rings 22, 24 are straightforward. Node interface chips (nodes) 26 form a mesh 21 and a processor 28 is associated with each node interface chip 26.

Figure 4:
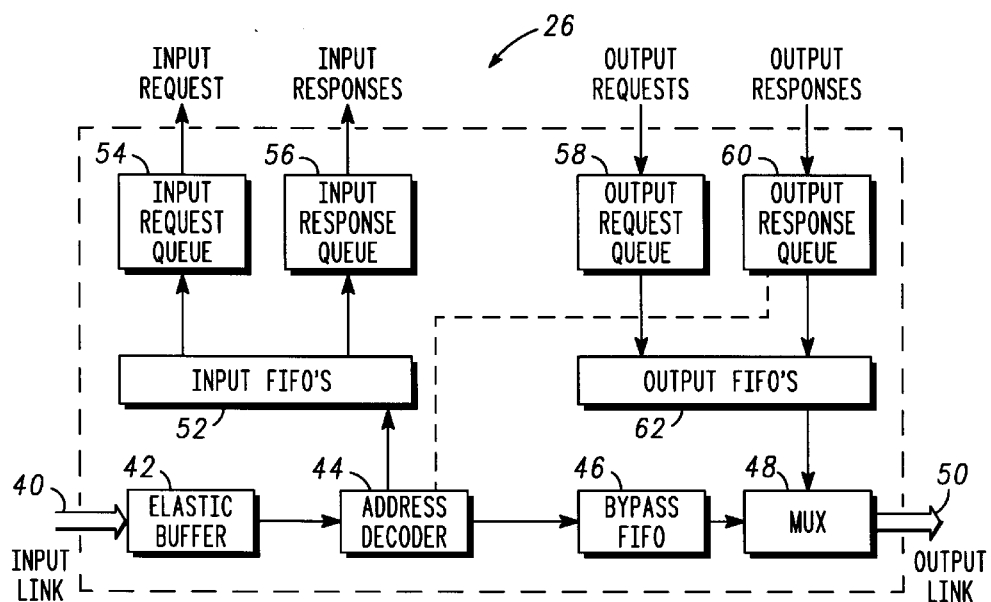
FIG. 4 is a flow diagram of the node interface chip logic according to the principles of the present invention.

FIG. 4 details the function of each node interface chip 26. Signals enter node 26 through an input link 40 to an elastic buffer 42. The elastic buffer 42 re-times the signal to the local node time. A signal entering each node 26 can be of three kinds: a signal not destined for the particular node 26, a signal generated by other processors 28 and destined for the particular node 26 or a signal generated by other processors 28 in response to requests sent out by the particular processor 28 of the particular node 26, which are destined for the particular node 26.

The elastic buffer 42 passes the re-timed signal to an address decoder 44. The address decoder 44 analyzes the address associated with the signal and determines if the signal is destined for the particular node 26. If address decoder 44 determines that the signal is not destined for that particular node 26, the signal is sent to a bypass first-in-first-out (FIFO) gate 46 for transmission to the downstream node. However, if address decoder 44 determines that the signal is destined for the particular node 26 the signal is sent to a first signal alignment gate or input FIFO gate 52 for delivery to the particular processor 28 associated with the particular node 26. The input FIFO gate 52 aligns the signal with node queues associated with the latter two types of the messages (described above) that can be addressed to that particular node 26. The input FIFO gate 52 is further connected to a first input queue or input request queue 54 and a second input queue or input response queue 56. Each node interface chip 26 also includes a second signal alignment gate or output FIFO gate 62 connected to and receiving signals from a first output queue or output request queue 58 and a second output queue or output response queue 60.

Requests from other processors 28 for services of the particular processor 28 associated with the particular node 26 are placed in the input request queue 54. Responses from other processors 28 to requests made by the particular processor 28 of the particular node 26 are placed in the input response queue 56. After being serviced by processor 28, requests for services from other processors 28 are placed in the output request queue 58 of the particular node 26. Likewise, responses to requests received from other processors 28, generated by the processor 28 associated with the particular node 26, are placed in the output response queue 60. Messages from both the output request queue 58 and the output response queue 60 are gathered by the output FIFO gate 62 for delivery to another node 26. An output multiplexer 48 selects from the bypass FIFO gate 46 or the output FIFO gate 62 for delivering the processed signals to other nodes 26. The selected signal is then transferred out through an output link 50.

It should be noted that node interface chip 26, shown in FIG. 4, is of a single dimension, as it has a single input link 40 and a single output link 50. It is foreseen, however, that node interface chip 26 can have multiple input and output links for establishing multiple dimensions. For example, each node interface chip 26 could have two input links 40 and two output links 50, resulting in a two-dimensional chip, for a two-dimensional mesh 21, or three input links 40 and three output links 50, resulting in a three-dimensional chip, for a three dimensional mesh 21.

Node interface chip 26 can itself automatically generate an acknowledge message. The output response queue 60 generates the acknowledge message upon successful receipt of a request for service from another processor 28 and placement of hat request in input FIFO gate 52 by the address decoder 44. The acknowledge message is sent to the originating node 26 informing the particular processor 28, of the originating node 26, of receipt of the request.

Referring back to FIGS. 2 and 3, each processor 28 is coupled with either a demodulator 30 or modulator 32. Processors 28 associated with a demodulator 30 handle Demand Assignment, Multiple Access (DAMA) and other link requests as well as routing of traffic packets. Processors 28 associated with a modulator 32 handle queuing of DAMA and other link responses, as well as traffic packets for the modulator 32. The communication link between the transceiver and either a demodulator 30 or a modulator 32 is managed by the resource controller 19.

As will be appreciated by one skilled in the art, mesh 21 can comprise varying numbers of node interface chips 26, processors 28, demodulators 30 and modulators 32. For example, mesh 21 could be a 10×10 matrix of components or could be a 1000×1000 matrix of components. The size of mesh 21 will be dependent upon the particular routing needs of the communications system.

Crosslink collection points 34 and crosslink injection points 36 are dispersed throughout mesh 21. Each crosslink collection point 34 comprises a node interface chip 26 and a processor 28. By way of non-limiting example, each crosslink might have eight (8) crosslink collection points 34, two in each quadrant of the mesh 21. Any processor 28, associated with a demodulator 30, which identifies a packet destined for a particular crosslink, sends the packet to the nearest crosslink collection point 34 in mesh 21. Similarly, each crosslink might have eight (8) crosslink injection points 36, two in each quadrant of mesh 21. If a message received over a crosslink is to be sent to a particular processor 28 and modulator 32, the crosslink sends the message to the crosslink injection point 36, nearest that particular node 26 in the mesh 21.

As previously described, processors 28, associated with demodulators 30, handle all of the DAMA requests and other link signaling, as well as performing all packet routing for traffic packets that flow from the particular demodulator 30. The resource controller 19 allocates the uplink and downlink information amongst the various demodulators 30 and modulators 32 in the mesh 21. Each processor 28 must know which beam a packet is coming from in order to properly process the maintenance and DAMA packets received from the resource controller. To achieve this, each demodulated DAMA and maintenance request contains an origination beam and channel identification. In this manner, a processor 28 is provided with all of the information necessary for getting the link signaling or DAMA response to an appropriate modulator 32.

Scalability is achieved by designing the mesh 21 for the number of beams it has to support. By way of non-limiting example, a system with 1000 ports might be based on a 32×32 mesh 21 of processors 28. A system of 100 ports might be based on a 10×10 mesh 21 architecture. In scaling the system from 100 to 1000 processors 28, additional serial bus segments 22, 24 are added. The addition of more bus segments 22, 24 increases the bandwidth of the system proportionally so that a 1000 processor 28 design achieves 10 times the transport bandwidth of a 100 processor 28 mesh 21.

Fault tolerance is inherent to the mesh 21 itself. A processor 28 or bus segment failure is easily detected by other processors 28 in the mesh 21, around a failed node 26 or link. Rerouting algorithms can excise the failed node 26 or link from the mesh 21 and restore data transport through the mesh 21 with only slight degradation in performance. Accordingly, each node interface chip 26 within the mesh 21 can be programmed by another processor 28 for routing signals around a failed node 26 or a failed segment of the router mesh 21.

Flexibility results from the programmable nature of the processors 28 which make up the nodes 26 of the mesh 21. As part of the present invention, each processor 28 may be remotely updated with one or more new software programs for changing a protocol forming part of the satellite communication system 10. New software downloaded to each processor 28 in the mesh 21 can increase the efficiency of the distributed router or program new link-layer protocols into certain ports as required by the changing communications system.

The invention being thus described, it will be obvious that the same may be varied in many ways. Such variations are not to be regarded as a departure from the spirit and scope of the invention. Such variations or modifications, as would be obvious to one skilled in the art, are intended to be included within the scope of the following claims.

What is claimed is:

1. A network router architecture for a satellite communications system, comprising:
   a link signal detection component;
   a controller configured to manage said link signal detection component and to receive a plurality of signals therefrom; and
   at least two communications rings interconnected by a plurality of processing nodes coupled to each other and to said controller to form a router mesh having an array structure of at least two dimensions, wherein each of the processing nodes comprises:
   a node interface chip connected to said router mesh; and
   a processor coupled to said node interface chip, wherein said processor is configured to process at least one of said plurality of signals received from said controller.

2. The network router architecture of claim 1, wherein each of said plurality of node interface chips include:
   at least one input interface and one output interface for connecting to said router mesh;
   a signal address decoder for analyzing an address for said link signal;
   a bypass for sending said link signal directly to said output interface when said address fails to correspond to said node interface chip;
   a first signal alignment gate for transferring said link signal to said processor;
   a second signal alignment gate for receiving said link signal from said processor; and
   a multiplexer for selectively transferring said link signal from said bypass and said second signal alignment gate to said output interface.

3. The network router architecture of claim 2, wherein said first signal alignment gate further includes first and second input queues.

4. The network router architecture of claim 2, wherein said second signal alignment gate further includes first and second output queues.

5. The network router architecture of claim 1, wherein each of said processors may be remotely updated with one of a plurality of programs to change a protocol of said satellite communications system.

6. The network router architecture of claim 1, wherein each of said node interface chips can be programmed by an associated processor for routing signals around a failed node or a failed segment of said router mesh.

7. The network router architecture of claim 1, wherein after receiving a processing request from an originating processor one of said node interface chips subsequently generates a second signal for acknowledging receipt of said processing request.

8. The network router architecture of claim 1, wherein said link signal detection component is a transceiver.

9. The network router architecture of claim 1 wherein the router mesh includes a plurality of horizontal communication components and a plurality of vertical communication components interconnected for forming a two-dimensional array.

10. The network router architecture of claim 9 wherein each horizontal communication component and each vertical communication are interconnected by at least one node interface chip.

11. The network router architecture of claim 10 wherein each of the horizontal and vertical communication components is a ring architecture forming a communication bus between adjacent node interface chips.

12. The network router architecture of claim 11 wherein the ring architecture is a scalable coherent interface (SCI) ring.

13. A communications network satellite comprising:
   a link signal detection component;
   a controller configured to manage said link signal detection component and to receive a plurality of signals therefrom; and
   a network router comprising at least two communications rings interconnected by a plurality of processing nodes coupled to each other and to said controller to form a router mesh having an array structure of at least two dimensions, wherein each of the processing nodes comprises:
      a node interface chip connected to said router mesh; and
      a processor coupled to said node interface chip, wherein said processor is configured to process at least one of said plurality of signals received from said controller.

14. The communications network satellite of claim 13, wherein each of said plurality of node interface chips include:
   at least one input interface and one output interface for connecting to said router mesh;
   a signal address decoder for analyzing an address for said link signal;
   a bypass for sending said link signal directly to said output interface when said address fails to correspond to said node interface chip;
   a first signal alignment gate for transferring said link signal to said processor;
   a second signal alignment gate for receiving said link signal from said processor; and
   a multiplexer for selectively transferring said link signal from said bypass and said second signal alignment gate to said output interface.

15. The communications network satellite of claim 14, wherein said first signal alignment gate further comprises first and second input queues.

16. The communications network satellite of claim 14, wherein said second signal alignment gate further comprises first and second output queues.

17. The communications network satellite of claim 13, wherein after receiving a processing request from an originating processor one of said node interface chips subsequently generates a second signal for acknowledging receipt of said processing request.

18. The communications network satellite of claim 13, wherein said link signal detection component is a transceiver.

* * * * *